United States Patent
Dean et al.

(10) Patent No.: US 9,032,941 B2
(45) Date of Patent: May 19, 2015

(54) METHOD FOR CONTROLLING EXHAUST GAS RE-CIRCULATION SYSTEM IN AN INTERNAL COMBUSTION ENGINE

(71) Applicant: GM Global Technology Operations LLC, Detroit, MI (US)

(72) Inventors: Charles Dean, Royal Oak, MI (US); Manuel Angel Gonzalez Delgado, Rochester Hills, MI (US); Michael J. Lucido, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 262 days.

(21) Appl. No.: 13/686,224

(22) Filed: Nov. 27, 2012

(65) Prior Publication Data
US 2014/0144414 A1 May 29, 2014

(51) Int. Cl.
| | | |
|---|---|---|
| F02D 41/00 | (2006.01) | |
| F02B 47/08 | (2006.01) | |
| F02D 13/02 | (2006.01) | |
| F02M 25/07 | (2006.01) | |
| F01L 1/18 | (2006.01) | |
| F01L 13/00 | (2006.01) | |
| F01L 1/047 | (2006.01) | |
| F01L 1/053 | (2006.01) | |
| F02D 41/02 | (2006.01) | |
| F02D 41/06 | (2006.01) | |
| F02D 41/40 | (2006.01) | |

(52) U.S. Cl.
CPC .............. *F02D 41/006* (2013.01); *F02B 47/08* (2013.01); *F02D 2041/0067* (2013.01); *Y02T 10/121* (2013.01); *F02M 25/0707* (2013.01); *F02M 25/0709* (2013.01); *F02M 25/0718* (2013.01); *F02M 25/0728* (2013.01); *F02M 25/0752* (2013.01); *F02D 13/0246* (2013.01); *F02D 13/0273* (2013.01); *F01L 1/185* (2013.01); *F01L 13/0036* (2013.01); *F01L 2001/0476* (2013.01); *F01L 2001/0537* (2013.01); *F01L 2105/00* (2013.01); *F01L 2800/10* (2013.01); *F02D 41/0065* (2013.01); *F02D 41/024* (2013.01); *F02D 41/064* (2013.01); *F02D 41/405* (2013.01); *F02D 2200/021* (2013.01)

(58) Field of Classification Search
CPC .......... F02D 41/006; F02D 2041/0067; F02D 13/0246; F02M 25/0752; F02M 25/0754
USPC ............. 123/568.14, 568.11, 568.12, 568.13; 701/108; 60/278, 280, 298, 605.2
See application file for complete search history.

(56) References Cited

U.S. PATENT DOCUMENTS

| | | | |
|---|---|---|---|
| 7,059,309 B2* | 6/2006 | Nomura | 123/568.14 |
| 2007/0062179 A1* | 3/2007 | Leone | 60/285 |
| 2010/0224151 A1* | 9/2010 | Moon et al. | 123/90.15 |

*Primary Examiner* — Mahmoud Gimie
(74) *Attorney, Agent, or Firm* — Cantor Colburn LLP

(57) ABSTRACT

A method for controlling re-circulation of exhaust gas (EGR) in an internal combustion engine includes receiving a signal indicative of an engine operating temperature and comparing the engine operating temperature to a first predetermined IEGR threshold. When the engine operating temperature is less than the first predetermined internal EGR threshold, a first internal EGR mode is activated, whereby engine emissions may be reduced or combustion stability may be enhanced. When the engine operating temperature is greater than the first predetermined internal EGR threshold, the first internal EGR mode is deactivated, and a second internal EGR mode is activated, whereby emissions may be reduced as exhaust system heating is accelerated. When the operating temperature is greater than the second temperature threshold, the second internal EGR mode may be deactivated a third mode may be enabled with only external EGR.

19 Claims, 6 Drawing Sheets

METHOD FOR CONTROLLING EXHAUST GAS RE-CIRCULATION SYSTEM IN AN INTERNAL COMBUSTION ENGINE

FIELD OF THE INVENTION

The subject invention relates to methods for controlling internal exhaust gas re-circulation in an internal combustion engine and more particularly to a method for controlling internal exhaust gas re-circulation involving multiple internal exhaust gas re-circulation modes.

BACKGROUND

In today's world, re-circulated exhaust gas ("EGR") is utilized in internal combustion engines to assist in the reduction of throttling losses at low loads, to improve knock tolerance, and to reduce the level of oxides of nitrogen ("NOx") in the exhaust gas. EGR is especially important as an emissions reducer in internal combustion engines that run lean of stoichiometry and are thus prone to emitting higher levels of NOx emissions.

Internal combustion engines that include exhaust gas re-circulation systems may rely upon internal EGR (IEGR), external EGR (EEGR), or a combination of the two. EEGR involves introduction of EGR into an engine combustion chamber through an intake valve after the EGR has traveled through an external conduit from the exhaust system. IEGR involves introduction of EGR into an engine combustion chamber through an exhaust valve or an intake valve without use of an external conduit. In order to provide exhaust flow to the combustion chambers when using EEGR, a pressure differential is needed between the exhaust flow path of the engine and the location in the intake system where the exhaust gas is reintroduced. For IEGR, an intake event (i.e., expansion of the volume within the combustion chamber, such as during the intake stroke of a piston in an internal combustion engine), typically provides a suitable pressure differential.

An IEGR system may take advantage of this pressure differential by opening one or more exhaust valves during the intake event of the valve's associated cylinder. A camshaft may be configured to facilitate selective activation and deactivation of valve-timing schemes, enabling IEGR to be selectively activated and/or deactivated. Duration, timing, and valve lift (i.e., flow rate) are affected by geometry of the camshaft in cooperation with the components of the valve train. Switchable rocker arms can facilitate switching between sets of lobes on a modified camshaft to enable switching between EGR modes. For example, a variable rocker arm assembly may be actuated or switched based on oil pressure, which can be modulated by an oil control valve. As different modes are actuated, different cam lobes become active, resulting in control over timing of valve actuation and thus control over IEGR.

During initial stages of engine operation following a cold start (i.e., approximately 200 seconds), before an engine reaches normal operating temperatures (e.g., coolant temperatures exceeding approximately 90 degrees C.), exhaust emissions may tend to exceed desirable or permissible levels. At relatively low exhaust temperatures, such as during engine warm-up, EEGR may negatively impact combustion stability and may also cause increased hydrocarbon (HC) emissions. IEGR may be useful in a strategy for DOC heating.

Fuel based warm-up strategies involving adjustments (retarding) to main injection timing and use of late post-injections have been used to accelerate the exhaust warm-up phase. Unfortunately, however, such practices can negatively impact HC emissions before the catalyst light-off and may also impact combustion stability with EEGR. IEGR provides transfer (i.e., recovery) of energy from a previous cycle to current cycle (recovering heat that would otherwise be discharged with exhaust gas and preheating the charge in the combustion chamber) while reducing heat losses with flow transport through the relatively high temperature exhaust system. As a result, IEGR facilitates increased temperatures of the air-fuel mixture prior to combustion. The resulting elevated combustion chamber temperatures can reduce ignition delays and associated emissions of CO and HC, particularly during cold engine operation. In addition, IEGR may result in increased exhaust gas temperatures, improving effectiveness of after-treatment components and thereby further reducing emissions of HC and CO.

Accordingly, it is desirable to have an improved method for controlling exhaust gas re-circulation in an internal combustion engine.

SUMMARY OF THE INVENTION

In one exemplary embodiment of the invention, a method for controlling re-circulation of exhaust gas in an internal combustion engine includes receiving a signal indicative of an engine operating temperature and comparing the engine operating temperature to a first predetermined IEGR threshold. When the engine operating temperature is less than the first predetermined IEGR threshold, a first IEGR mode is activated. When the engine operating temperature is greater than the first predetermined IEGR threshold, the first IEGR mode is deactivated, and a second IEGR mode is activated.

In an exemplary embodiment of the invention, a method for controlling re-circulation of exhaust gas in an internal combustion engine includes receiving a signal indicative of an engine operating temperature and comparing the engine operating temperature to a first predetermined IEGR threshold. When the engine operating temperature is less than the first predetermined IEGR threshold, a first IEGR mode is activated. After a predetermined first period of time, the first IEGR mode is deactivated and a second IEGR mode is activated.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION OF THE DRAWINGS

Figure 1:
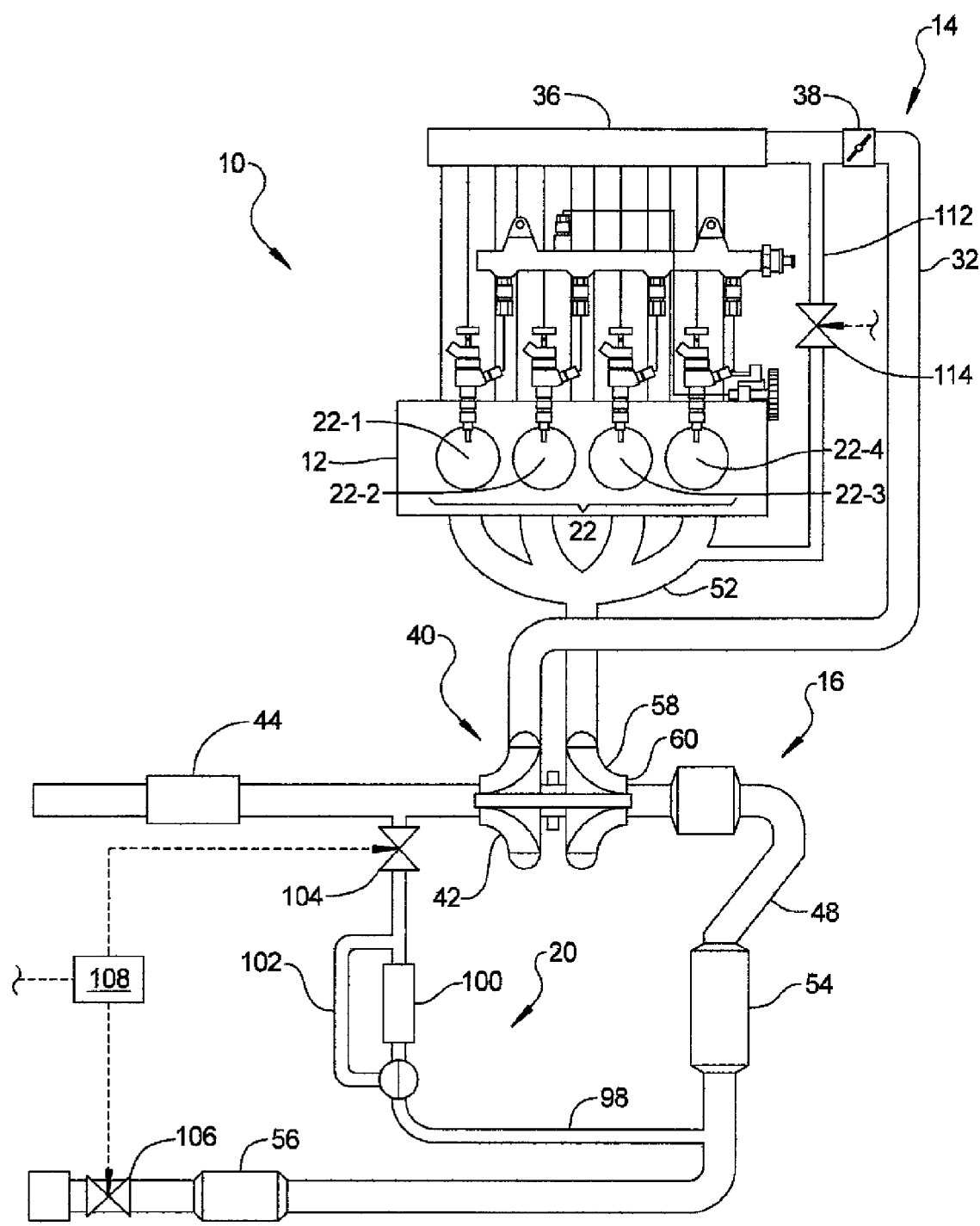
FIG. 1 is a schematic illustration of an engine assembly according to the present disclosure.

The following description is merely exemplary in nature and is not intended to limit the present disclosure, its application or uses. It should be understood that throughout the drawings, corresponding reference numerals indicate like or corresponding parts and features. Exemplary embodiments are provided including details relating to various examples of specific components, devices, and methods, to provide a more thorough understanding of the disclosed embodiments. It should be understood that some specific details are not strictly necessary, that example embodiments may be embodied in many different forms, and that neither should be construed to limit the scope of the disclosure. In some exemplary embodiments, well-known processes, well-known device structures, and well-known technologies are not described in detail. As used herein, the term "module" refers to an application specific integrated circuit (ASIC), an electronic circuit, and/or a processor (shared, dedicated, or group) and memory that execute one or more software or firmware programs. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 2:
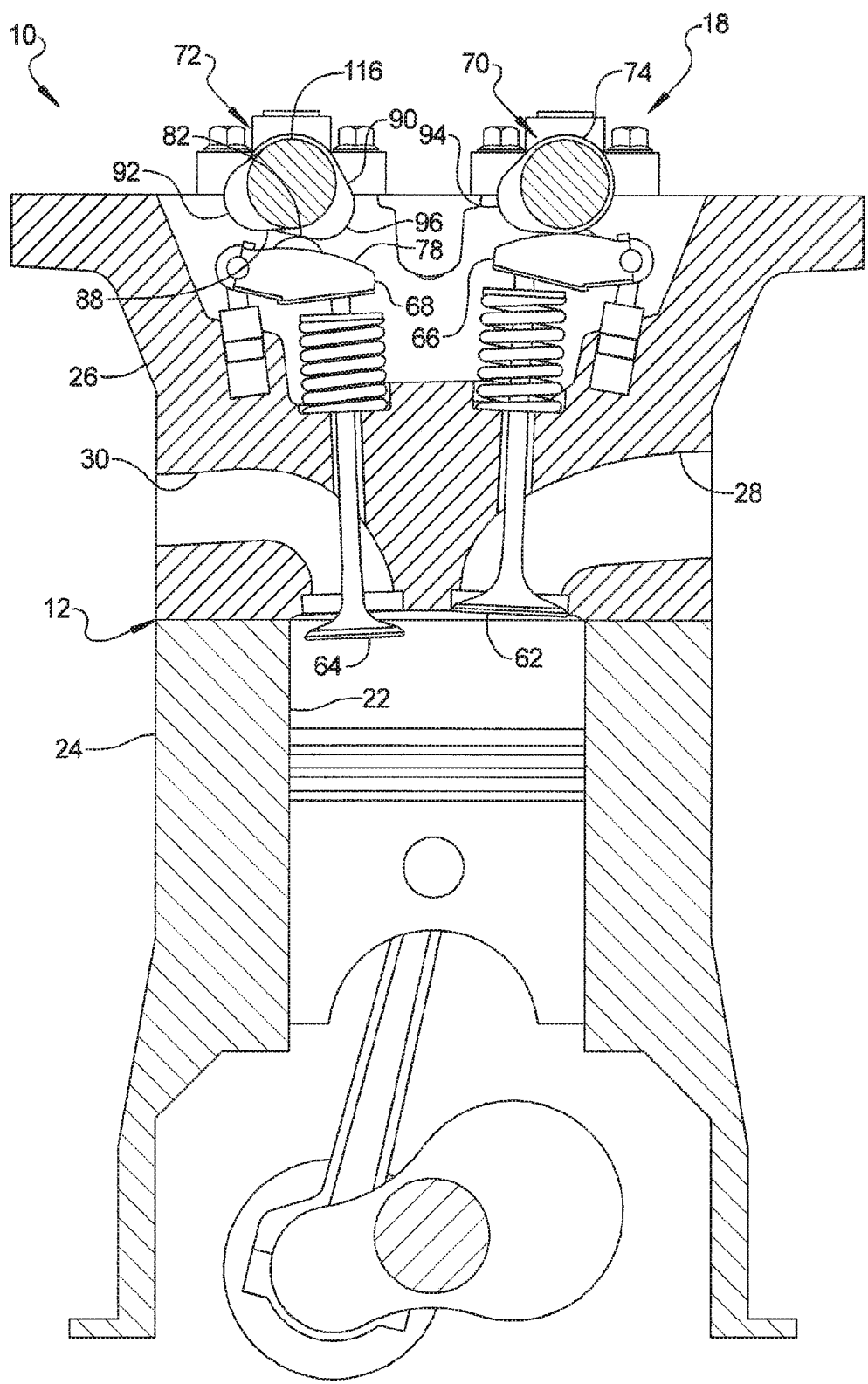
FIG. 2 is a schematic section view of the engine assembly from FIG. 1.

With reference to FIG. 1 and FIG. 2, in an exemplary embodiment, an engine assembly 10 includes an engine structure 12, an intake system 14, an exhaust system 16, a valvetrain assembly 18, and an exhaust gas re-circulation (EGR) assembly 20. The engine structure 12 comprises an engine block 24 coupled to a cylinder head 26 to define cylinders 22, which form combustion chambers. The cylinder head 26 defines intake ports 28 and exhaust ports 30 in communication with the combustion chambers.

As shown schematically in FIG. 1, the engine assembly 10 defines four cylinders (22-1, 22-2, 22-3, 22-4). For simplicity, only a single representative cylinder is illustrated in the section view shown in FIG. 2; however, the features and aspects discussed relative to the cylinder shown in FIG. 2 are equally relevant to the remaining cylinders 22. Additionally, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

In an exemplary embodiment, the intake system 14 includes an intake runner 32, an intake manifold 36 that is coupled to the cylinder head 26 and in fluid communication with the intake runner 32, and an intake throttle valve 38 disposed in the intake runner 32. The intake throttle valve 38 may be configured for one or more purposes including: (a) airflow control, (b) pressure differential across a short-route EGR cooler, (c) smooth engine shutoff, (d) management of EGR flow rate, and/or (e) controlling a rate of flow of intake air to intake ports 28 through the intake manifold 36. The intake system 14 also includes a turbocharger 40 including an intake side 42 (compressor) located in the intake runner 32 and an air cleaner 44 located in the intake runner 32. The intake runner 32 may define an air inlet into the intake system 14, and the turbocharger 40 may be in communication with the intake ports 28 via the intake manifold 36. While a single turbocharger 40 is illustrated, it is understood that the present disclosure applies equally to arrangements including multiple turbochargers.

The exhaust system 16 may include an exhaust conduit 48, an exhaust manifold 52 coupled to the cylinder head 26 and in communication with the exhaust conduit 48, a diesel particulate filter (DPF) 54, and a selective catalytic reduction (SCR) catalyst 56 located in the exhaust conduit 48. While illustrated as including an individual DPF 54 and an individual SCR catalyst 56, it is understood that the present disclosure is not limited to such arrangements. The DPF 54 may alternatively be included in a combined DPF/SCR catalyst. Further, the SCR catalyst 56 may alternatively be located upstream of the DPF 54 or an additional SCR catalyst (not shown) may be included upstream of the DPF 54. The exhaust side 58 (turbine) of the turbocharger 40 may be located in the exhaust conduit 48 and may include a turbine wheel in communication with and driven by exhaust gas flowing through the exhaust conduit 48. The exhaust side 58 of the turbocharger 40 may include a variable exhaust gas outlet 60 that controls an exhaust gas flow restriction through the turbocharger 40. The variable exhaust gas outlet 60 may be in the form of a variable nozzle.

Figure 3:
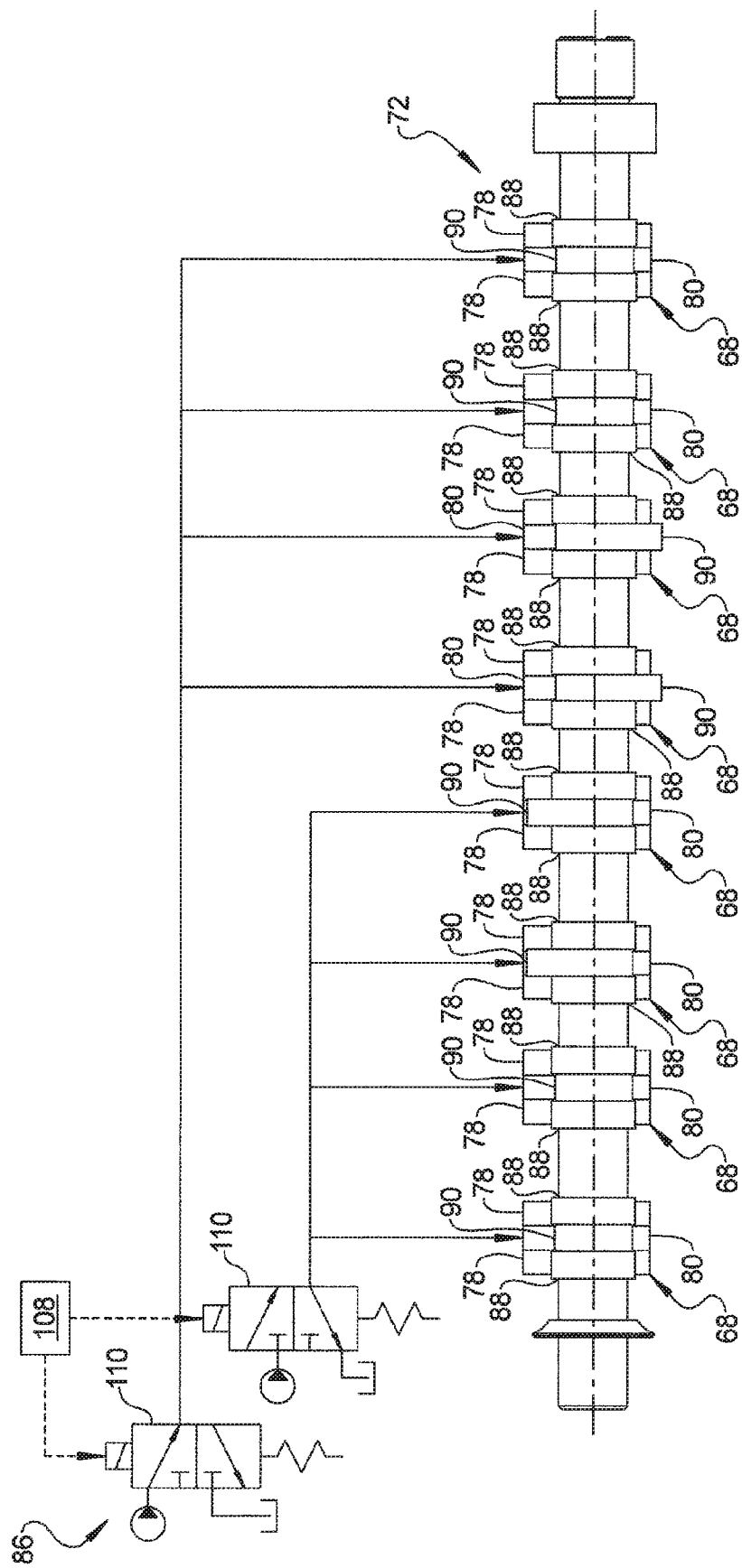
FIG. 3 is a schematic illustration of the valvetrain assembly shown in FIG. 2.

As seen in FIGS. 2 and 3, the valvetrain assembly 18 may include intake valves 62 located in the intake ports 28, exhaust valves 64 located in the exhaust ports 30, intake valve lift mechanisms 66 supported on the cylinder head 26 and engaged with the intake valves 62, exhaust valve lift mechanisms 68 supported on the cylinder head 26 and engaged with the exhaust valves 64, an intake camshaft 70 supported for rotation on the cylinder head 26 and engaged with the intake valve lift mechanisms 66 and an exhaust camshaft 72 supported for rotation on the cylinder head 26 and engaged with the exhaust valve lift mechanisms 68. The intake camshaft 70 may include intake cam lobes 74 engaged with each of the intake valve lift mechanisms 66. The intake camshaft 70 may include an intake cam phaser (not shown) and the intake valve lift mechanisms 66 may take a variety of forms including, but not limited to, conventional or variable valve lift mechanisms.

Figure 4:
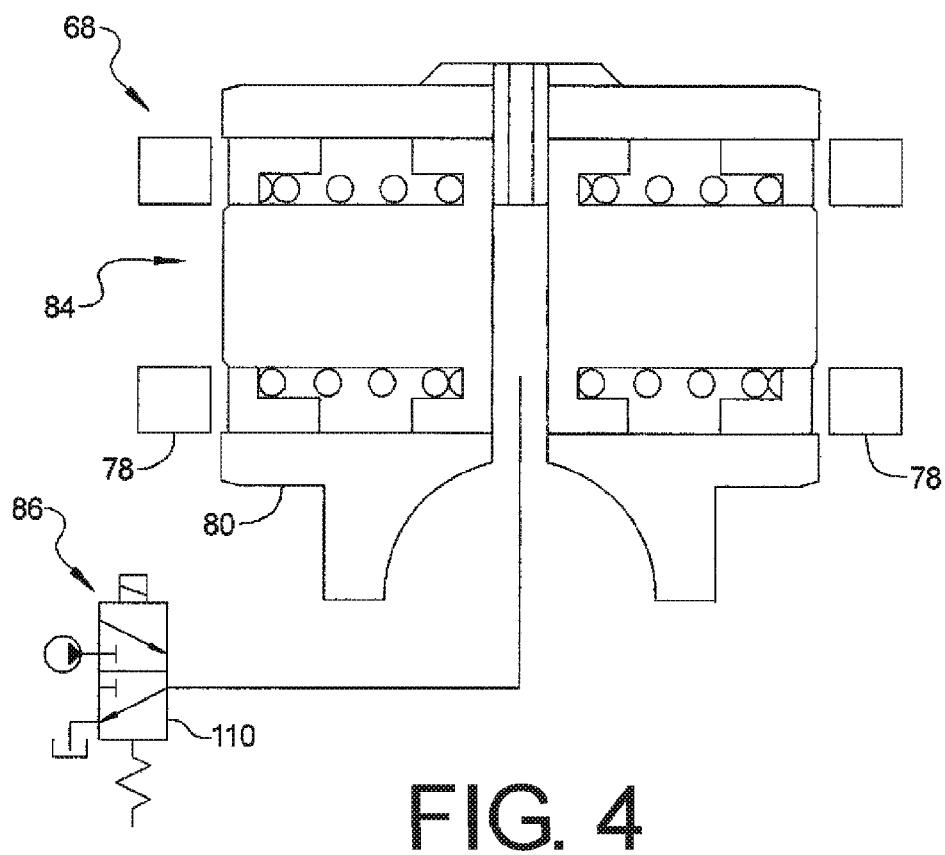
FIG. 4 is a schematic section view of an exhaust valve lift mechanism from the valvetrain assembly shown in FIGS. 2 and 3.
Figure 5:
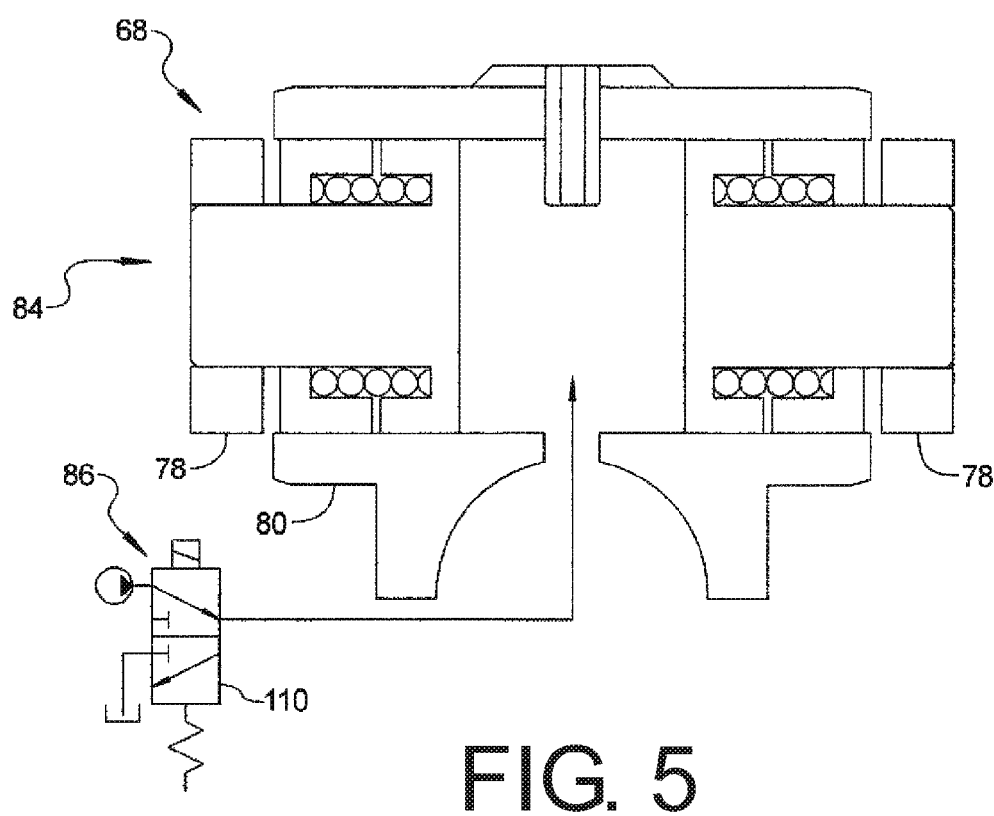
FIG. 5 is an additional schematic section view of the exhaust valve lift mechanism from the valvetrain assembly shown in FIGS. 2 and 3.

The exhaust valve lift mechanisms 68 may form hydraulically actuated deactivating valve lift mechanisms operable in a plurality of modes, such as first, second and third operating modes. In the present non-limiting example, and as seen in FIGS. 4 and 5, the exhaust valve lift mechanisms 68 may be in the form of a rocker arm including a pair of outer arms 78, an inner arm 80, including a roller 82 and a locking mechanism 84 selectively coupling the outer arms 78 to the inner arm 80. As seen in FIGS. 4 and 5, the locking mechanism 84 may be switched between locked and unlocked positions by a pressurized fluid supply 86. The locking mechanism 84 may secure the outer arms 78 for displacement with the inner arm 80 during the first mode and may allow relative displacement between the outer arms 78 and the inner arm 80 during the second mode. As seen in FIGS. 4 and 5, the exhaust valve lift mechanisms 68 may normally be biased to the unlocked position (no IEGR) and may be switched to the locked position by the pressurized fluid supply 86 (providing IEGR). However, it is understood that the present disclosure applies equally to arrangements with the exhaust valve lift mechanisms 68 being normally biased to the locked position and being switched to the unlocked position by the pressurized fluid supply 86. While both exhaust valve lift mechanisms 68 for each cylinder are shown as deactivating valve lift mechanisms in FIG. 3, it is understood that the present disclosure is not limited to such arrangements and applies equally to arrangements where only one of the exhaust valve lift mechanisms 68 per cylinder is a deactivating valve lift mechanism.

The exhaust camshaft 72 may include EGR cam lobes 88 engaged with each of the outer arms 78 and exhaust cam lobes 90 located between pairs of EGR cam lobes 88 and engaged with the inner arm 80. Each of the EGR cam lobes 88 may define an EGR lift region 92 at least partially rotationally aligned with an intake lift region 94 defined by a corresponding one of the intake cam lobes 74. The exhaust cam lobes 90 may define exhaust lift regions 96 rotationally offset from the EGR lift region 92 and the intake lift region 94.

The EGR assembly 20 may include an EGR line 98, an EGR cooler 100 and cooler bypass 102 located in the EGR line 98, an EGR control valve 104 and a backpressure control valve 106. The EGR line 98 may extend from the exhaust conduit 48 at a location between the turbocharger 40 and an outlet of the exhaust conduit 48 to the intake system 14 to provide communication between the intake system 14 and the exhaust system 16.

In the non-limiting example shown in FIG. 1, the EGR control valve 104 may be located at the outlet of the EGR line 98 and may control exhaust gas re-circulation flow to the intake system 14 from the EGR line 98. The backpressure control valve 106 may be located in the exhaust conduit 48 at a location between the EGR line 98 and an outlet of the exhaust conduit 48. In the non-limiting example shown in FIG. 1, the backpressure control valve 106 is located at the outlet of the exhaust conduit 48. The DPF 54 may be located in the exhaust conduit 48 at a location between the exhaust side 58 of the turbocharger 40 and the backpressure control valve 106. The arrangement discussed above provides an IEGR system in combination with a low pressure EGR system.

The engine assembly 10 may additionally include a control module 108 in communication with the EGR control valve 104 and the backpressure control valve 106. As seen in FIGS. 3-5, the pressurized fluid supply 86 for the exhaust valve lift mechanisms 68 may include oil control valves 110 in communication with and controlled by the control module 108. It should be noted that the intake throttle valve 38 may also be in communication with the control module 108.

The backpressure control valve 106 may be used to control the pressure differential between the intake system 14 and the exhaust system 16 for both the IEGR system and the low pressure EGR system to adjust re-circulation of exhaust gas in the engine assembly 10. The exhaust valve lift mechanisms 68 and the EGR control valve 104 may be adjusted by the control module 108 to provide a desired amount of exhaust gas re-circulation during engine operation. The intake throttle valve 38 and the variable exhaust gas outlet 60 of the turbocharger 40 may also be used to control the pressure differential between the intake system 14 and the exhaust system 16 to further adjust the amount of exhaust gas re-circulated in the engine assembly 10. In some arrangements, the EGR assembly 20 may additionally include a bypass passage 112 and a bypass valve 114 located in the bypass passage 112 and in communication with the control module 108. The bypass passage 112 may extend from the exhaust manifold 52 to a region of the intake runner 32 located between the intake throttle valve 38 and the intake manifold 36 to provide further control of exhaust gas re-circulation.

The EGR lift region 92 of the EGR cam lobes 88 provides internal exhaust gas re-circulation. The IEGR system may be used as the high pressure EGR system, eliminating the typical high pressure EGR lines and cooler and the potential for high pressure EGR cooler fouling.

As seen in FIG. 2, the lift regions 92, 94, 96 may generally be defined as regions of the cam lobes 74, 88, 90 including lobe peaks that extend from a base circle region to provide valve lift. The exhaust valve 64 may be displaced to an open position when the peak of the exhaust cam lobes 90 engage the exhaust valve lift mechanisms 68 during both the first and second modes. The exhaust valve 64 may be displaced to an open position when the peaks of the EGR cam lobes 88 engage the exhaust valve lift mechanisms 68 during the first mode and the exhaust valve 64 may remain in the closed position when the peaks of the EGR cam lobes 88 engage the exhaust valve lift mechanisms 68 during the second mode. The EGR cam lobes 88 may provide internal exhaust gas re-circulation when the exhaust valve lift mechanisms 68 are operated in the first mode.

The base circle region 116 of each of the EGR cam lobes 88 may continuously extend from an end of the EGR lift region 92 to a start of the EGR lift region 92 in a rotational direction of the EGR cam lobes 88. Because the EGR cam lobes 88 only include an EGR lift region 92, an increased time window may be available for switching between the first and second modes. As a result, one oil control valve 110 may be used for a pair of cylinders 22. In the present non-limiting example, a first oil control valve 110 may be used for the first and second cylinders 22-1, 22-2 and a second oil control valve 110 may be used for the third and fourth cylinders 22-3, 22-4.

As seen in FIG. 3, the engine assembly includes first EGR cam lobes 88 and first exhaust cam lobes 90 engaged with first exhaust valve lift mechanisms 68 for the first cylinder 22-1, second EGR cam lobes 88 and second exhaust cam lobes 90 engaged with second exhaust valve lift mechanisms 68 for the second cylinder 22-2, third EGR cam lobes 88 and third exhaust cam lobes 90 engaged with third exhaust valve lift mechanisms 68 for the third cylinder 22-3, and fourth EGR cam lobes 88 and fourth exhaust cam lobes 90 engaged with fourth exhaust valve lift mechanisms 68 for the fourth cylinder 22-4. In the present non-limiting example, the firing order of the cylinders 22 may be first cylinder 22-1, third cylinder 22-3, fourth cylinder 22-4, second cylinder 22-2 and then repeat. The combustion event occurring in the first combustion chamber (first cylinder 22-1) is immediately subsequent to the combustion event in the second combustion chamber (second cylinder 22-2) and the combustion event occurring in the fourth combustion chamber (fourth cylinder 22-4) is immediately subsequent to the combustion event in the third combustion chamber (third cylinder 22-3).

The first and second exhaust valve lift mechanisms 68 may each be in communication with the first oil control valve 110 and the third and fourth exhaust valve lift mechanisms 68 may each be in communication with the second oil control valve 110. In addition to the increased time window being available for switching between the first and second modes, the EGR cam lobes 88 having only an EGR lift region 92 also facilitates the opportunity to have increased exhaust valve opening for the internal exhaust gas re-circulation event. A non-limiting example of the opening profiles for the intake valves 62 and the exhaust valves 64 of a cylinder are illustrated in the graph included in FIG. 6. The X-axis in FIG. 6 represents crank angle and the Y-axis represents valve lift.

Figure 6:
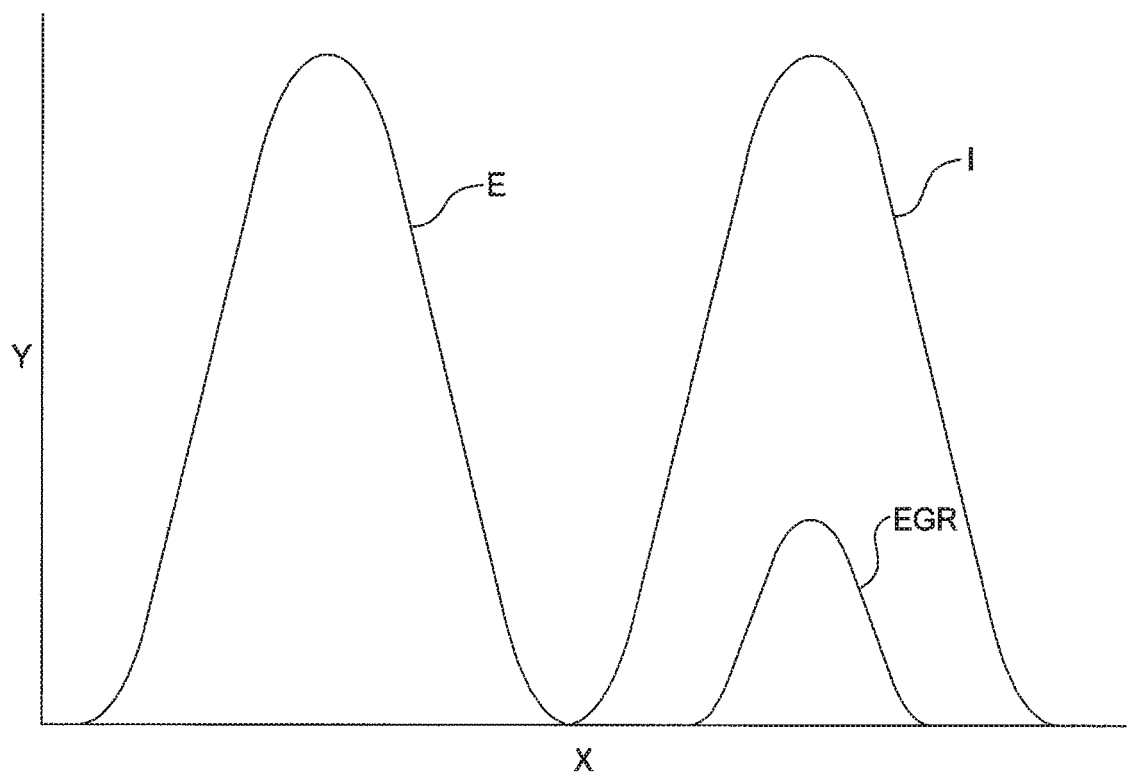
FIG. 6 is a chart illustrating exemplary intake and exhaust valve operation as a function of time as facilitated by an engine assembly as in FIGS. 1-5.

As seen in FIG. 6, the exhaust valve 64 may completely close between an exhaust valve lift event (E) provided by the exhaust cam lobe 90 and a subsequent EGR valve lift event (EGR) provided by the EGR cam lobes 88 during operation of the exhaust valve lift mechanisms 68 in the first mode. The lift of the exhaust valve 64 provided during the EGR valve lift event (EGR) may correspond to between twenty percent and sixty percent of the peak lift of the exhaust valve 64 provided during the exhaust valve lift event (E). Additionally, an entirety of the opening of the exhaust valve 64 by the EGR lift region 92 during the first mode may occur while a corresponding intake valve 62 (i.e., intake valve for the same cylinder) is open as illustrated by the intake valve lift event (I).

During rotation of the exhaust camshaft 72, the base circle region 116 of the EGR cam lobe 88 may be free from contact with the exhaust valve lift mechanisms 68. More specifically, the base circle region 116 may always be radially offset from the outer arm 78. The engagement between the EGR cam lobes 88 and the exhaust valve lift mechanisms 68 may be limited to the EGR lift region 92. The limited engagement between the EGR cam lobes 88 and the exhaust valve lift mechanisms 68 may limit the resulting friction relative to an arrangement where a cam lobe is continuously in contact with a valve lift mechanism.

Accordingly, control over IEGR is accomplished through use of engine valvetrain hardware, which causes an exhaust valve 64 to open during an intake stroke of the engine. Duration and timing and flow rate can all be controlled by the valve train. A variable geometry valvetrain is capable of switching between EGR modes. For example, a variable rocker arm assembly may be actuated based on oil pressure, which can be modulated via an oil control valve. As different modes are actuated, different cam lobes become active, resulting in different valve timing. In an exemplary embodiment, the above-described hardware may be utilized to provide an IEGR control mode strategy that includes switching between valve profiles, variable throttling of the intake stream, control over back pressure imposed in the exhaust stream, and timed injection system events. In combination, a strategy may be devised for improving the rate at which the exhaust stream temperature achieves a desirable operating temperature as well as after-treatment conversion efficiency.

A plurality of operating modes may be provided, each mode being tailored to achieve specific needs associated with a phase of the particular warm-up characteristics of a particular engine system. For example, a first mode may be tailored to provide for DOC heating and/or cold start combustion stability, while a second mode is tailored for SCR heating. The resulting strategy may be useful for improving emissions where IEGR is used during exhaust warm-up following a cold start. It should be appreciated that, in accordance with such strategies, IEGR volumes may be sufficient to supply fully half of the volume of gas in a combustion chamber.

Figure 7:
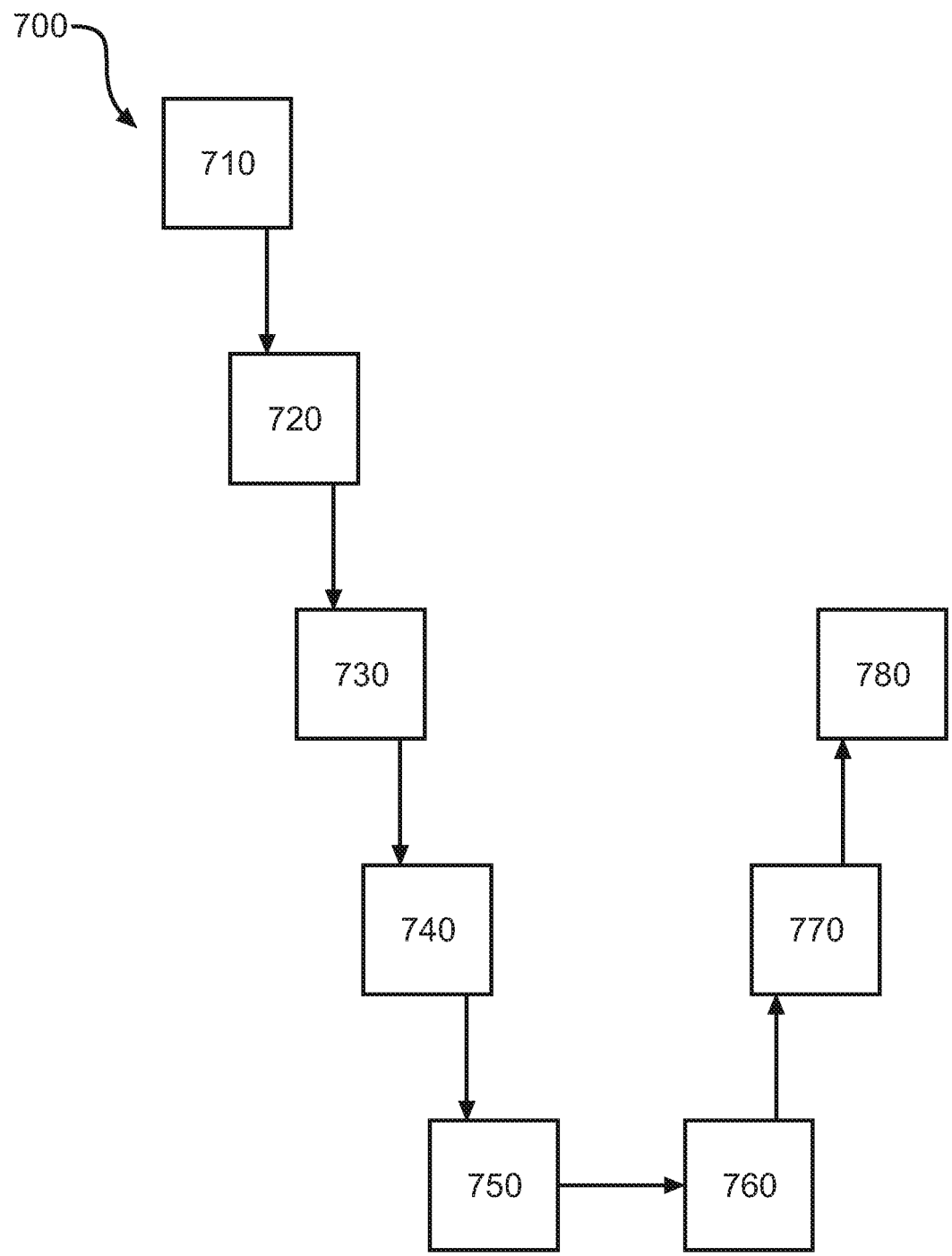
FIG. 7 is a flow chart illustrating an exemplary method for controlling internal exhaust gas re-circulation in an internal combustion engine.

As shown in FIG. 7, in an exemplary embodiment, a method 700 for illustrating internal re-circulation of exhaust gas in an internal combustion engine includes receiving (step 710) a signal that is indicative of an engine operating temperature. The signal may be based on an actual measurement taken by an item of instrumentation such as an appropriately positioned thermocouple or may be based on a simulation or correlation based on empirical data. For example, the signal may be representative of a coolant temperature, an exhaust gas temperature, a temperature of an exhaust catalyst, or an oil temperature.

In an exemplary embodiment, the signal (i.e., the represented engine operating temperature) is compared (step 720) to a first IEGR threshold. The first IEGR threshold may be predetermined and stored in a memory and may be adjusted based on experienced performance of the engine. When the engine operating temperature is less than the first predetermined IEGR threshold, a first IEGR mode may be activated (step 730) so as to achieve a desired effect such as reduction of engine emissions or enhancement of combustion stability. In an exemplary embodiment, a first IEGR mode is implicated whenever: (a) the engine operating temperature is less than the first predetermined IEGR threshold (which may correspond to a predetermined DOC threshold temperature); (b) a rate (e.g., volume) of fuel injected per engine cycle is less than a predetermined threshold fuel injection rate; and (c) an engine speed is less than a predetermined threshold engine speed.

When the engine operating temperature is greater than the first predetermined IEGR threshold, the first IEGR mode may be deactivated (step 740), and a second IEGR mode may be activated (step 750) so as to achieve a desired effect such as reduction in regulated emissions and acceleration of exhaust system heating. In an exemplary embodiment, the engine operating temperature may be compared (step 760) to a second predetermined IEGR threshold to determine whether the engine operating temperature is greater than or less than the second predetermined IEGR threshold. In an exemplary embodiment, a second IEGR mode is implicated whenever: (a) the engine operating temperature exceeds the first predetermined IEGR threshold (which may correspond to a predetermined DOC threshold temperature); (b) the engine operating temperature is less than the second predetermined IEGR threshold (which may also correspond to a predetermined SCR threshold temperature); (c) a rate (e.g., volume) of fuel injected per engine cycle is less than a predetermined threshold fuel injection rate; and (d) an engine speed is less than a predetermined threshold engine speed. Finally, when the engine operating temperature is greater than the second predetermined IEGR threshold, the second IEGR mode may be deactivated.

In an exemplary embodiment, the engine operating temperature may be compared (step 770) to a predetermined EEGR threshold to determine whether the engine operating temperature is greater than or less than the predetermined EEGR threshold. When the engine operating temperature is greater than the predetermined EEGR threshold, an EEGR mode may be activated step (780). When the engine operating temperature is less than the predetermined EEGR threshold, the EEGR mode may be deactivated. It should be appreciated that the second predetermined IEGR threshold may be equal to the predetermined EEGR threshold. It should also be noted that the second predetermined IEGR threshold may be greater than the predetermined EEGR threshold, or, alternatively, the predetermined EEGR threshold may be greater than the second predetermined IEGR threshold.

In an exemplary embodiment, the engine operating temperature may be a coolant temperature, an exhaust temperature, or even an oil temperature. Control strategies disclosed herein involve use of IEGR during the engine warm-up period. It should be appreciated that IEGR may be used in combination with long-route or short-route EEGR so as to provide improved control over total in-cylinder residuals. Exhaust backpressure control and/or intake throttling may be used to control IEGR. Similarly, combined Internal and EEGR may also be used to effectuate control.

In an exemplary embodiment, the first IEGR mode may be configured to achieve warm-up of the Diesel Oxidation Catalyst (DOC) and to thereby reduce HC emissions in the exhaust stream. More specifically, after cold start, before the diesel oxidation catalyst (DOC) reaches its desired operating temperature, IEGR is used during the first IEGR mode to reduce engine-out NOx and HC emissions and increase exhaust temperature for faster light-off of the DOC. Such a mode may become active immediately following a cold start of the engine and may be characterized by activation of IEGR accompanied by deactivation of the DOC. This mode may remain active for a predetermined time interval, such as, for example 40 seconds, with the time interval being specified so as to satisfy a particular set of requirements in a particular situation. For example, the time interval may be configured so as to accommodate a particular after-treatment temperature profile and/or may correspond to an EPA test cycle. As a result, combustion stability is enhanced and HC emissions are reduced.

In an exemplary embodiment, the first IEGR mode corresponds to a warm-up period of engine operation wherein a coolant temperature is less than approximately 90 degrees C. and a DOC temperature is less than approximately 180 degrees C. During this first IEGR mode, fuel injection timing may be advanced while a large pilot quantity is used to enhance stability of combustion reduce HC. In an exemplary embodiment, a second pilot is not needed nor is a late-post injection of fuel. Back-pressure may be controlled to assist in actuation of IEGR. This initial or first IEGR mode may be tailored to reduce HC emissions while improving combustion stability.

In an exemplary embodiment, the second IEGR mode may be configured for warming the SCR and thereby reducing NOx emissions while increasing combustion temperature. Put another way, once the DOC is at operating temperature, the IEGR is used in conjunction with the fuel system to rapidly warm-up the NOx after-treatment system. Such a mode may be active for a time interval (such as approximately 80 seconds), which may be predetermined so as to meet specific requirements, immediately following an initial, first IEGR mode. This mode may be characterized by activation of IEGR accompanied by activation of the DOC. As a result, combustion temperatures may be increased while NOx emissions are reduced. In an exemplary embodiment, the second IEGR mode immediately follows an initial warm-up period of engine operation and begins when a coolant temperature first exceeds approximately 90 degrees C., a DOC temperature first exceeds approximately 180 degrees C., and SCR temperatures remain below approximately 200 degrees C. During this second IEGR mode, a late-post injection of fuel may be activated while the SCR warms up. In addition, injection timing may be retarded in order to reduce NOx emissions.

In an exemplary embodiment, in order to reduce particulates in the exhaust and to provide for increased tolerance to IEGR as well as to provide increased temperatures in the exhaust stream during this second IEGR mode, a mid-post injection may be initiated at approximately 25 to 40 degrees after TDC. This post-injection event facilitates warm-up of the SCR. In addition, the intake stream may be throttled to provide air-fuel ratio control at low-loads. Still further, back-pressure may be controlled for IEGR quantity control. It should be appreciated that actual switching points may vary from engine system to engine system depending upon exhaust system architecture and catalyst formulation. Once the NOx after-treatment is up to operating temperature, the IEGR cam profile is disabled for conventional after-treatment. If, however, the temperature of the NOx after-treatment drops below operating temperature, the second IEGR mode will be activated until the desired operating temperature is achieved.

Accordingly, an exemplary method 700 for controlling internal re-circulation of exhaust gas in an internal combustion engine includes receiving a signal that is indicative of an engine operating temperature such as a coolant temperature, an exhaust temperature, or an oil temperature. Then, the engine operating temperature is compared against a first predetermined IEGR threshold. When the engine operating temperature is less than the first predetermined IEGR threshold, a first IEGR mode is activated with controls set so as to achieve reduced HC emissions in the exhaust stream while the engine operating temperature increases for a time interval, such as approximately 40 seconds.

After reaching the first predetermined temperature threshold, the first IEGR mode is deactivated, and a second IEGR mode may be activated. The second IEGR mode may be configured for reducing NOx emissions while increasing combustion temperatures and may remain active until reaching or exceeding the second predetermined temperature threshold following an initial, first IEGR mode. During the second IEGR mode, IEGR may be activated while the DOC is also activated. As a result, combustion temperatures may be increased while NOx emissions are reduced.

After a predetermined third period of time, which may correspond to the deactivation of the second IEGR mode, e.g., approximately 120 seconds after the cold start, an EEGR mode may be activated. It should be appreciated that the third period of time may be less than the second period of time such that the EEGR mode becomes active while the second IEGR mode is still active. Alternatively, the third period of time may be greater than the second period of time such that the EEGR mode becomes active only after the second IEGR mode has been deactivated. This EEGR mode may be characterized by deactivation of IEGR with fuel injection controlled to achieve reduced fuel consumption.

IEGR can provide: faster control response of charge dilution during transient operation, efficient heating of the in-cylinder charge, enhanced cold combustion stability and higher after-treatment efficiency during the warm-up process of diesel engines. In addition, control modes for IEGR can be optimized for hardware architecture and specific component performance to reach emissions levels not possible with current diesel technology. Still further, transition from IEGR to normal combustion modes can be optimized to minimize emissions and fuel economy for the overall driving cycle. After-treatment systems may all be activated including urea dosing, activation of the SCR, and activation of the DOC.

Exhaust re-breathing with back-pressure control can provide very high amounts of trapped residuals for increased exhaust temperatures. By providing two warm-up modes, which may each be configured to maximize effectiveness of IEGR along with emissions and drivability, the invention enables warm-up using IEGR control within reduced warm-up times. A set of enabling conditions, such as predefined transition temperature thresholds or mode duration times, may define the transitions between modes. The transitions may be based on feedback produced by monitoring engine and exhaust after-treatment temperatures, engine speed and load.

The invention provides improvements in cold-start emissions, after-treatment effectiveness, and cold-engine drivability. Other benefits may include improved fuel economy associated with reduced reliance on injection of raw fuel into the exhaust in order to warm the NOx after-treatment systems. IEGR greatly enhances the effectiveness of the warm-up modes, in-turn providing much improved warm-up emissions. Therefore, for warm-up, IEGR may be used exclusively, enabling diesel engines to achieve reduced emissions. At high loads, however, IEGR may be deactivated, facilitating smoke reduction through EEGR.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling re-circulation of exhaust gas in an internal combustion engine comprising:
   receiving a signal indicative of an engine operating temperature;
   comparing the engine operating temperature to a first predetermined IEGR threshold;
   when the engine operating temperature is less than the first predetermined IEGR threshold, activating a first IEGR mode;
   when the engine operating temperature is greater than the first predetermined IEGR threshold, deactivating the first IEGR mode and activating a second IEGR mode; and
   comparing the engine operating temperature to a second predetermined IEGR threshold, and, when the engine operating temperature is greater than the second predetermined IEGR threshold deactivating the second IEGR mode.

2. The method of claim 1, further comprising activating an EEGR mode.

3. The method of claim 2, further comprising comparing the engine operating temperature to a predetermined EEGR threshold, wherein said activating an EEGR mode is performed when the engine operating temperature is greater than the predetermined EEGR threshold.

4. The method of claim 2, further comprising:
   comparing the engine operating temperature to a predetermined EEGR threshold; and
   deactivating the EEGR mode when the engine operating temperature is less than the predetermined EEGR threshold.

5. The method of claim 3, wherein the second predetermined IEGR threshold is equal to the predetermined EEGR threshold.

6. The method of claim 3, wherein the second predetermined IEGR threshold is greater than the predetermined EEGR threshold.

7. The method of claim 3, wherein the predetermined EEGR threshold is greater than the second predetermined IEGR threshold.

8. The method of claim 1, wherein the engine operating temperature is a coolant temperature.

9. The method of claim 1, wherein the engine operating temperature is an exhaust temperature.

10. The method of claim 1, wherein the engine operating temperature is an oil temperature.

11. The method of claim 1, wherein the first IEGR mode is configured for low HC.

12. The method of claim 1, wherein the first IEGR mode is configured for high combustion stability.

13. The method of claim 1, wherein the second IEGR mode is configured for low NOx.

14. The method of claim 1, wherein the second IEGR mode is configured for high exhaust temperature.

15. A method for controlling re-circulation of exhaust gas in an internal combustion engine comprising:
   receiving a signal indicative of an engine operating temperature;
   comparing the engine operating temperature to a first predetermined IEGR threshold;
   when the engine operating temperature is less than the first predetermined IEGR threshold, activating a first IEGR mode; and
   after a predetermined first period of time, deactivating the first IEGR mode and activating a second IEGR mode.

16. The method of claim 15, further comprising, after a predetermined second period of time, deactivating the second IEGR mode.

17. The method of claim 16, further comprising, after a predetermined third period of time, activating an EEGR mode.

18. The method of claim 17, wherein the predetermined third period of time is less than the predetermined second period of time.

19. The method of claim 17, wherein the predetermined third period of time is greater than the predetermined second period of time.

* * * * *